(12) United States Patent
Ko (10) Patent No.: US 10,386,199 B2
(45) Date of Patent: Aug. 20, 2019

(54) NAVIGATION GUIDANCE APPARATUS AND METHOD USING WIDE-ANGLE LENS CAMERA IMAGE

(71) Applicant: THINKWARE SYSTEMS CORPORATION, Seongnam-si, Gyeonggi-do (KR)

(72) Inventor: Suk Pil Ko, Seoul (KR)

(73) Assignee: THINKWARE SYSTEMS CORPORATION, Seongnam-Si, Gyeonggi-do (KR)

( * ) Notice: Subject to any disclaimer, the term of this patent is extended or adjusted under 35 U.S.C. 154(b) by 140 days.

(21) Appl. No.: 14/405,149

(22) PCT Filed: Aug. 13, 2013

(86) PCT No.: PCT/KR2013/007260
§ 371 (c)(1),
(2) Date: Dec. 2, 2014

(87) PCT Pub. No.: WO2014/069763
PCT Pub. Date: May 8, 2014

(65) Prior Publication Data
US 2015/0145951 A1 May 28, 2015

(30) Foreign Application Priority Data

Oct. 30, 2012 (KR) .................. 10-2012-0120980

(51) Int. Cl.
*H04N 5/232* (2006.01)
*H04N 7/18* (2006.01)
(Continued)

(52) U.S. Cl.
CPC ......... *G01C 21/3647* (2013.01); *G08G 1/167* (2013.01); *G09B 29/106* (2013.01);
(Continued)

(58) Field of Classification Search
CPC .................................................. G01C 21/3647
(Continued)

(56) References Cited

U.S. PATENT DOCUMENTS

| 6,249,720 B1* | 6/2001 | Kubota | ............... B60R 16/0232 |
| | | | 340/990 |
| 2009/0125234 A1* | 5/2009 | Geelen | ............... G01C 21/3647 |
| | | | 701/533 |

(Continued)

FOREIGN PATENT DOCUMENTS

| JP | 2004-257979 A | 9/2004 |
| JP | 2006-017739 A | 1/2006 |

(Continued)

OTHER PUBLICATIONS

PCT International Search Report, PCT/KR2013/007260, dated Nov. 20, 2013, 4 Pages.

(Continued)

*Primary Examiner* — Jonathan R Messmore
(74) *Attorney, Agent, or Firm* — Fenwick & West LLP (57) ABSTRACT

The present invention relates to an apparatus for increasing navigation guidance efficiency using a camera image, and to a method for same. The navigation guidance apparatus includes an image obtaining unit that collects external images which are images in the moving direction of a vehicle and captured through a wide-angle lens camera; an image processing unit that processes the collected external images and obtains guidance images related to the guidance points; and an image displaying unit that displays the obtained guidance images on a navigation map.

21 Claims, 10 Drawing Sheets

(51) Int. Cl.
    *G01C 21/36*     (2006.01)
    *G09B 29/10*     (2006.01)
    *G08G 1/16*     (2006.01)

(52) U.S. Cl.
    CPC ..... *H04N 5/23238* (2013.01); *G01C 21/3602* (2013.01); *G01C 21/3664* (2013.01); *H04N 7/185* (2013.01)

(58) Field of Classification Search
    USPC .......................................................... 348/36
    See application file for complete search history.

(56) References Cited

U.S. PATENT DOCUMENTS

| | | | | |
|---|---|---|---|---|
| 2009/0256906 | A1* | 10/2009 | Ilsaka | G01C 21/3647 348/113 |
| 2010/0002070 | A1* | 1/2010 | Ahiska | G08B 13/19691 348/36 |
| 2012/0059720 | A1* | 3/2012 | Musabji | G01C 21/3638 705/14.58 |
| 2012/0226437 | A1* | 9/2012 | Li | G01C 21/3647 701/423 |

FOREIGN PATENT DOCUMENTS

| | | |
|---|---|---|
| KR | 20-2007-0000381 U | 3/2007 |
| KR | 10-0900072 B1 | 5/2009 |
| KR | 10-2010-0132761 A | 12/2010 |
| KR | 10-2011-0114114 A | 10/2011 |

OTHER PUBLICATIONS

Korean Intellectual Property Office, Office Action, Korean Application No. 10-2012-0120980, dated Mar. 14, 2019, 7 pages (with concise explanation of relevance).

* cited by examiner

NAVIGATION GUIDANCE APPARATUS AND METHOD USING WIDE-ANGLE LENS CAMERA IMAGE

TECHNICAL FIELD

Exemplary embodiments of the disclosure relate to an apparatus and a method for enhancing guide efficiency of navigation, using a camera image.

BACKGROUND

As an entrainment rate of an image storage black box for a vehicle for big and small accidents rises recently, a black box market is growing. Technology of such the black box is getting developing more and more and more follow-up models for supporting a HD grade high resolution are releasing. A view angle of a camera provided in a conventional black box currently released is 100~160 degrees and the camera can support a high resolution image, while keeping a broad view angle.

At this time, it is not so efficient to use the high image quality black box image only against accidents and there are ideas for communicating with an image of the black box. Accordingly, there are increasing demands for an apparatus capable of displaying guide information of the navigation after the black box is in communication with a navigation apparatus loaded in most vehicles.

DISCLOSURE

Technical Problem

Guide of navigation is divided into a safe driving guide and a route guide. When extracting a route to a destination in a double touch guide, guide elements of a turn point on a route is quite important. For the turn point important very much, an apparatus and a method for guide which has a highly effective guide efficiency by displaying an actual image of a point to be turn as well as a route on a map of the navigation.

There is a difference between actual human eyes and a view angle in an optical camera. Accordingly, when displaying only an extracted turn point, the sense of difference might be generated and an angle difference the driver cannot recognize. To overcome such disadvantage, Exemplary embodiments of the present disclosure provide a navigation which can provide an image a driver can feel like identifying a turn point after turning the face actually.

Technical Solution

To achieve these objects and other advantages and in accordance with the purpose of the invention, as embodied and broadly described herein, exemplary embodiments of the present disclosure provide a navigation guide apparatus including an image acquiring unit for collecting an external image which is a driving direction image of a vehicle captured via a wide angle lens camera; an image processing unit for acquiring a guide image associated with a guide spot by processing the collected external image; and an image display unit for displaying the acquired guide image on a map of the navigation.

The image acquiring unit may collect the external image, when a location of the vehicle is closer a preset distance or less to the guide spot.

The image processing unit may extract an image corresponding to a direction of the guide spot from the collected external image as the guide image.

The wide angle lens camera may be a black box camera supporting a high resolution image, with keeping a broad view angle, and the image acquiring unit may collect the external image, with being connected with the black box camera via a wire or wirelessly.

The guide image associated with the guide spot acquired by the image processing unit may be a real-time image for a turn point.

The turn point may be corresponding to right turn, left turn or U-turn, and the real-time image may be an image having peripheral vehicles and driving geographic information.

The external image may include a panorama image and an origin coordinate of the panorama image is equal to a coordinate of a compass or a relative angle is defined in advance.

The image processing unit may acquire a guide image for the guide spot from the panorama image, considering that an angle of the camera is rotated as an angle between a driving direction of the vehicle and a direction of the guide spot is varied according to a time or distance.

The image processing unit acquires the guide image by compensating a distortion of the external image through sequentially performing 1) calculating internal parameters and lens distortion factor of the wide angle lens camera; 2) generating an undistortion map table, using the parameters and lens distortion factor; and 3) extracting the undistorted image in real time, using the undistortion map table.

The image displaying unit may display the guide image processed by the image processing unit on a map of the navigation at the same time when the navigation starts to guide the guide spot.

The image displaying unit may determine a location where the guide image will be arranged, considering a location and a driving direction of the guide spot.

The image displaying unit may flick the guide image, when the displaying guide image is closer to a preset distance or less to the guide spot.

The image displaying unit may magnify or lessen the guide image.

The image displaying unit may perform at least one of moving, magnifying and lessening of the guide image on a map of the navigation via a touch screen, when the navigation provides a touchscreen.

Exemplary embodiments of the present disclosure also provide a navigation guide apparatus operating in a black box for a vehicle comprising a wide angle lens camera, the navigation guide apparatus including a request receiving unit for receiving a request for a guide image associated with a guide spot out of external images which are driving-direction external images from the navigation.

Exemplary embodiments of the present disclosure also provide a navigation guide method including a step of collecting an external image which is a direction of a vehicle captured by a wide angle lens camera; a step of acquiring a guide image associated with the guide spot by processing the collected external image; and a step of displaying the acquiring guide image on a map of the navigation.

Advantageous Effects

According to the embodiments of the present disclosure, guide of navigation is divided into a safe driving guide and a route guide. When extracting a route to a destination in a double touch guide, guide elements of a turn point on a route is quite important. For the turn point important very much, an apparatus and a method for guide which has a highly effective guide efficiency by displaying an actual image of a point to be turn as well as a route on a map of the navigation.

There is a difference between actual human eyes and a view angle in an optical camera. Accordingly, when displaying only an extracted turn point, the sense of difference might be generated and an angle difference the driver cannot recognize. To overcome such disadvantage, Exemplary embodiments of the present disclosure provide a navigation which can provide an image a driver can feel like identifying a turn point after turning the face actually.

DESCRIPTION OF DISCLOSURE

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Hereinafter, embodiments of the disclosure will be described, referring to the accompanying drawings.

Figure 1:
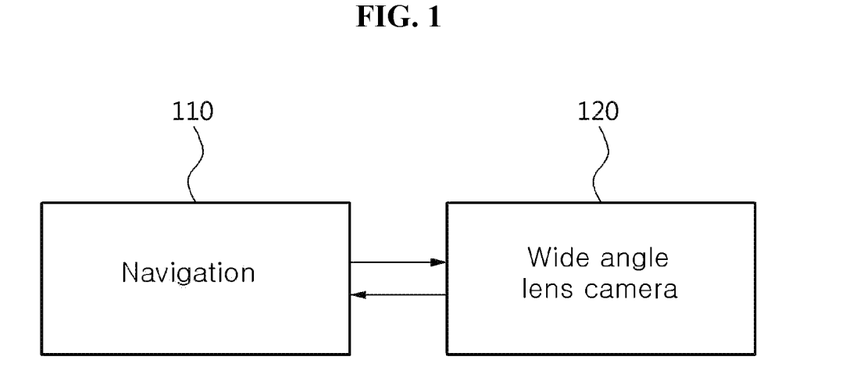
FIG. 1 is a diagram schematically illustrating an interaction between a navigation apparatus and a wide angle lens camera according to exemplary embodiments of the present disclosure.

FIG. 1 is a diagram schematically illustrating a navigation 110 for displaying a guide image and a wide angle lens camera 120 for providing a corresponding image according to exemplary embodiments of the disclosure. In one embodiment, the navigation 110 and the wide angle lens camera 120 are loaded together in a vehicle and they may be connected with each other via a wire or wirelessly.

The navigation 110 may provide a driver with information on locations and a peripheral map and a route to a destination. Recently, the navigation 110 may include MP3, a DMB receiving device and it may provide a high resolution display for a clear screen.

The wide angle lens camera 120 may be a camera for capturing peripheral external images near a vehicle. For instance, the wide angle lens camera 120 may be installed in a black box for a vehicle or a vehicle to capture a forward image. Such the camera may be the camera capable of capturing a HD-grade or higher resolution image, with keeping a broad view angle and no image breaks or bleed.

In the embodiment, the navigation 110 may ask the wide angle lens camera 120 for an external image and the wide angle lens camera 120 captures external images near the vehicle in real time. After that, the wide angle lens camera 120 may capture images to the navigation 110 and the navigation 110 may process the external images to provide the driver with a visually optimized guide image.

Alternatively, when the navigation 110 asks the wide angle lens camera 120 for an external image, the wide angle lens camera 120 captures external images near the vehicle in real time and processes the captured images only to create the visually optimized guide image. After that, the wide angle lens camera 120 may provide the navigation with the visually optimized guide image.

Figure 2:
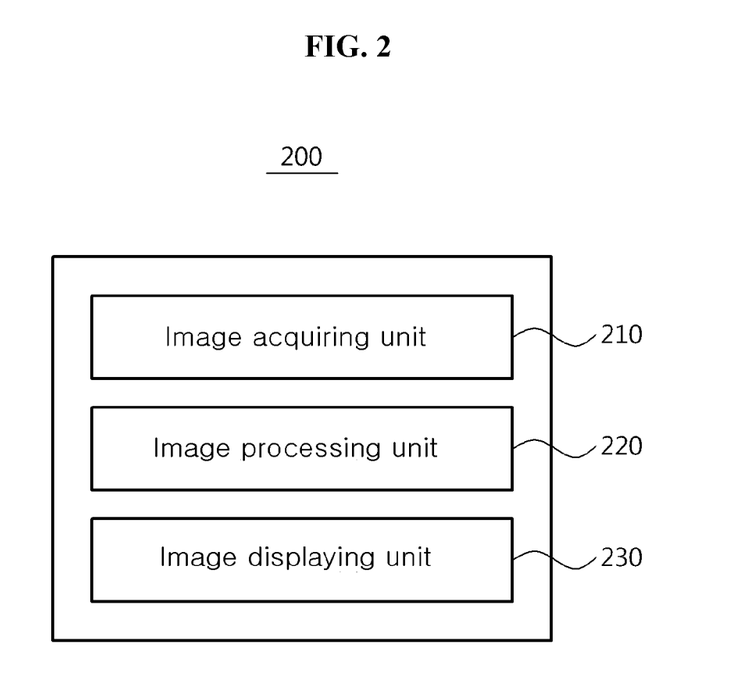
FIG. 2 is a block diagram illustrating each of elements provided in a navigation guide apparatus according to exemplary embodiments of the present disclosure.

FIG. 2 is a block diagram illustrating each of elements provided in a navigation guide apparatus 200 according to exemplary embodiments of the present disclosure. The navigation guide apparatus 200 may be provided in the navigation. The navigation guide apparatus 200 may include an image acquiring unit 210, an image processing unit 220 and an image display unit 230.

The image acquiring unit 210 may collect the external images which are images in forward direction of the vehicle from the wide angle lens camera. The acquired external images are real time images and they include information on peripheral vehicles and information on roads, driving and geography. In the embodiment, when a location of the driving vehicle is closer to a destination from a guide spot by a preset distance or less, the image acquiring unit 210 asks the wide angle lens camera for images for guide.

The image processing unit 220 provided in the navigation guide apparatus 200 may process the external images collected by the image acquiring unit 210 to acquire a guide image.

At this time, to guide a route to the destination, it is quite important to guide a turning point in guiding a route, such that a guide spot for acquiring an external image may be a turning point on the guide route. The turning point may be corresponding to left turn, right turn or U turn. Processing of the external image is compensating the external image, associated with a difference between the image collected by the wide angle lens camera and the actual image viewed by the user.

Figure 3:
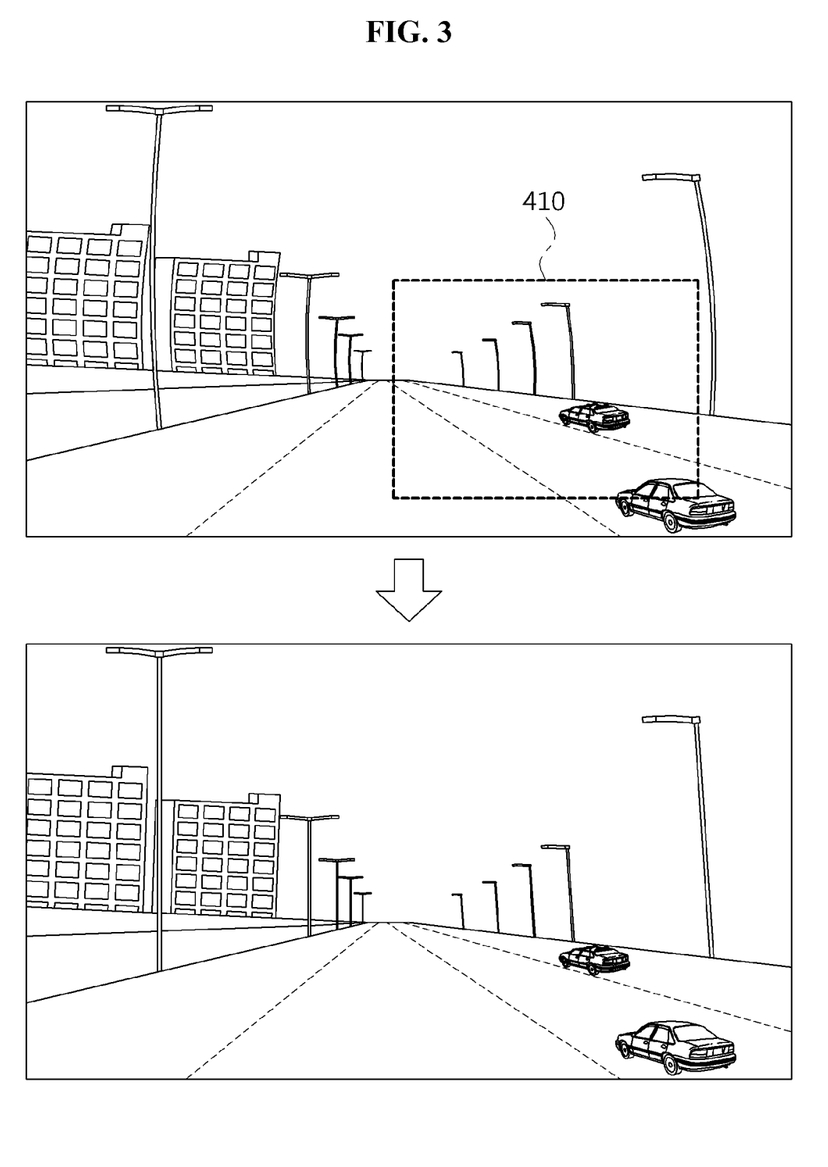
FIG. 3 is a diagram illustrating one example of an external image collected via a wide angle lens camera and a guide image for processing the collected image.
Figure 4:
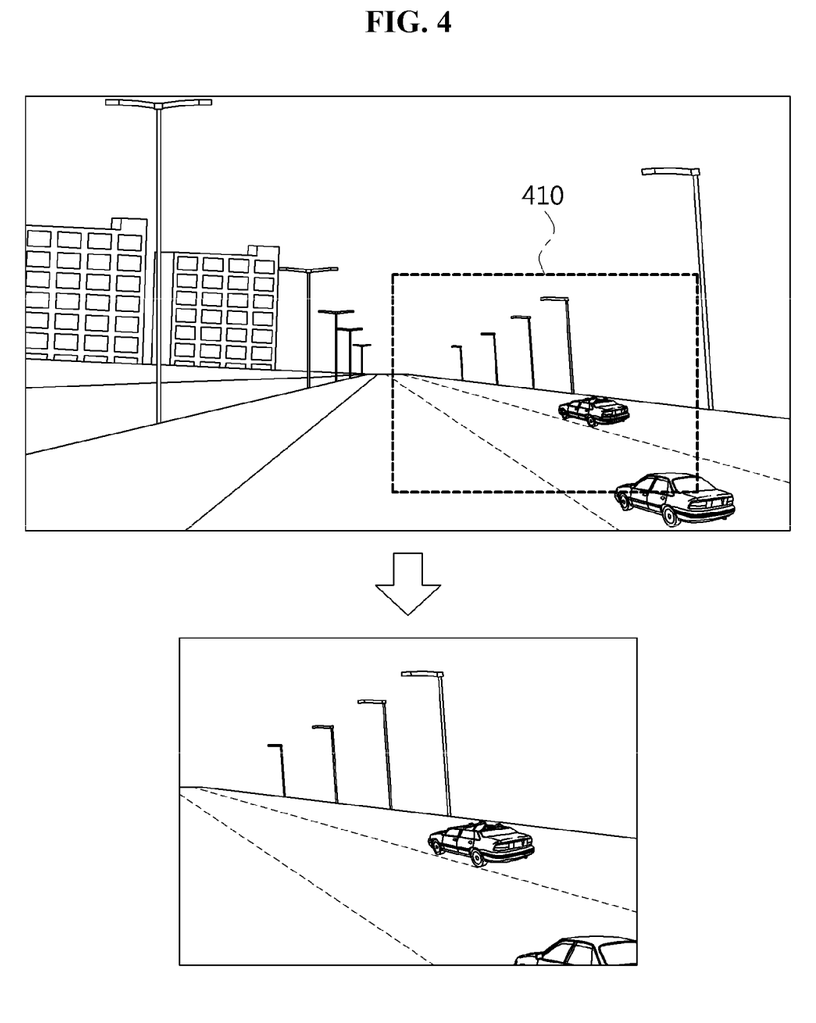
FIG. 4 is a diagram illustrating one example of a guide image having an area cut away for a guide spot according to exemplary embodiments of the present disclosure.
Figure 5:
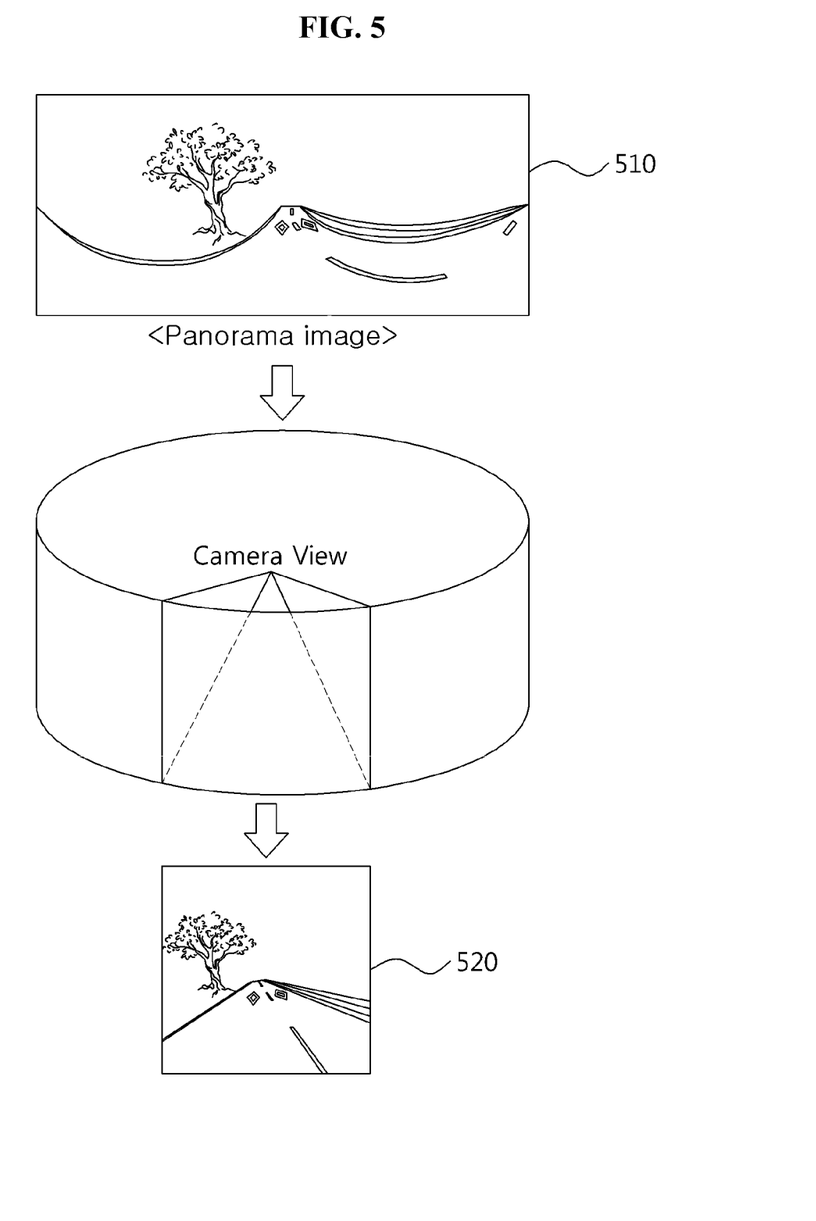
FIG. 5 is a diagram illustrating one embodiment of guiding a turn point, using a panorama image.

In one embodiment of the present disclosure, FIGS. 3 through 5 show how the image processing unit 220 compensates the external image.

First of all, FIG. 3 shows one embodiment of the image collected by the wide angle lens camera and the image compensated from the collected image. As shown in FIG. 3, the image collected by the wide angle lens camera is collected via a broad view angle and it could have a little distortion. Accordingly, an algorithm for compensating the distorted external image is provided.

In one embodiment:

1) Parameters provided in the camera, for instance, values of contrast, sharpness, chroma and tone and a distortion factor of a camera lens may be calculated via calibration of the wide angle lens camera for external images, for instance.

2) Undistortion Map Table which is a computer vision technology may be generated, using the calculated parameters and lens distortion factor.

3) Distortion of the high resolution real-time external image collected by the wide angle lens camera is reduced, using the undistortion map table, and the undistorted image can be extracted in real time.

Once the processes of 1)~3) are performed, an undistorted external image shown in a lower portion of FIG. 3 may be acquired and such the external image may be a screen having little difference from the image directly viewed by a person.

Meanwhile, the image processing unit 220 may cut away a partial area of the image corresponding to a guide spot direction on the guide route from the collected external image, as a substantial guide image 410 shown in the embodiment of FIG. 4. When displaying a whole image of the wide angle lens camera together with the guide map of the navigation, using the guide image partially displayed on the display, the driver's cognitive power for the collected external image could deteriorate. Accordingly, the image processing unit 220 may extract only an image corresponding to the direction of the guide spot from the collected external image, to provide the extracted image as the guide image 410.

In one embodiment of the present disclosure, a turn point can be guided, using a panorama image. FIG. 5 illustrates a process for guiding a turn point, using a panorama image 510.

The panorama image 510 shown in FIG. 5 may be an image made of 360-degree viewed images connected with respect to the camera.

In case of using the panorama image 510, an angel between a driving direction of the vehicle and the guide spot direction can be changed based on the time or distance and then an angle of the camera is rotated together. Accordingly, a guide image 520 for a spot where the driver has to turn may be guided in advance, considering that.

For that, when capturing the panorama image 510, an origin coordinate of the image may be equal to a coordinate of a compass or a relative angle has to be defined in advance.

In one embodiment of the present disclosure, the distortion may be reduced, using the panorama image 510 shown in FIG. 5 and a partial area is removed to extract only the image of the guide spot, only to acquire the guide image 520. For that, the algorithm for compensating the distorted external image mentioned above.

Figure 6:
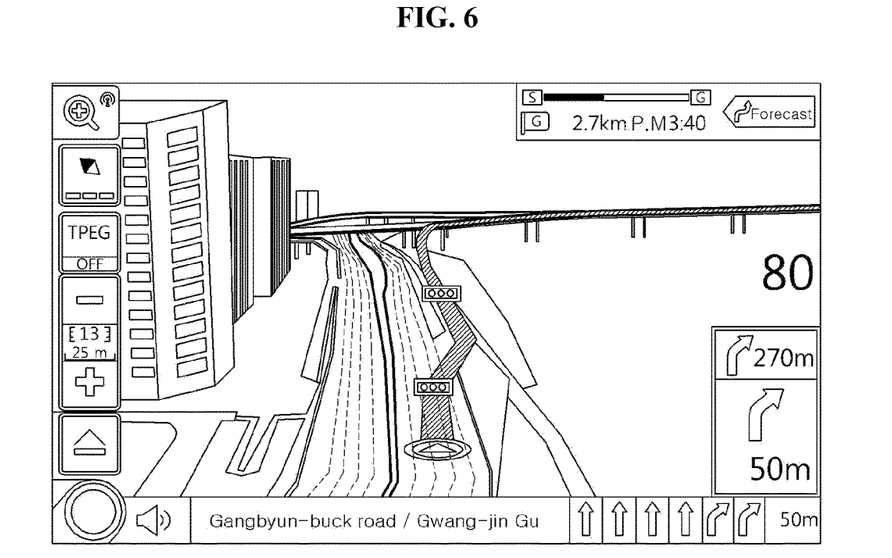
FIG. 6 is a diagram illustrating an example of a route guide screen of a conventional navigation.

Hereinafter, how the guide image is substantially displayed on the navigation will be described. FIG. 6 illustrates a route guide map displayed when guiding the route of the conventional navigation map. A route the vehicle has to move along, a location and a schematic traffic guide situation may be displayed on the navigation map together.

In one embodiment of the present disclosure, a conventional digital map may be displayed together with the guide image acquired via the wide angle lens camera as shown in FIG. 6.

Figure 7:
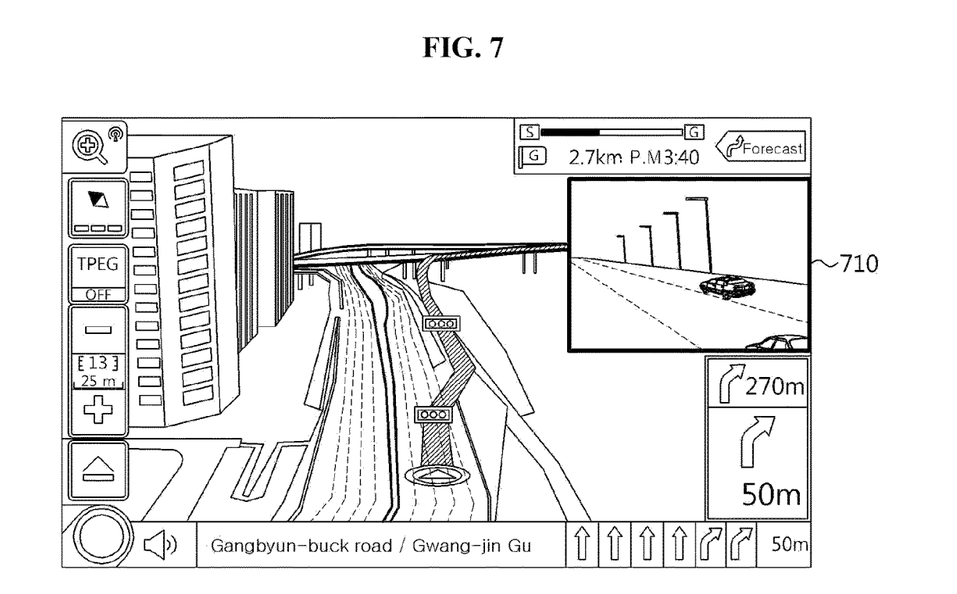
FIG. 7 is a diagram illustrating that a guide image collected via a wide angle lens camera is displayed on a navigation map according to exemplary embodiments of the present disclosure.

FIG. 7 illustrates one embodiment displaying a guide image 710 acquired once the image processing unit 220 processes an external image on a guide map of a conventional navigation shown in FIG. 6. The guide image 710 may be displayed on a margin of the navigation or a space where display is needless, such that the driver can have enhanced guide efficiency effectively.

In one embodiment, the guide image 710 shown in FIG. 7 is generated after distortion is removed from the real-time external image acquired from a wide angle lens camera of a black bod for a vehicle by the image acquiring unit 210, using the external image compensating algorithm proposed in the present disclosure and after an unnecessary image is cut away with respect to a guide spot.

The image displaying unit 230 may display the guide image 710 shown in FIG. 7, at the same time when the navigation starts to guide a guide spot or display the guide image processed by the image processing unit 220 usually. At this time, diverse options can be provided. Diverse embodiments of options which can be provided when displaying a guide image on the navigation will be provided, referring to FIGS. 8 through 12.

Figure 8:
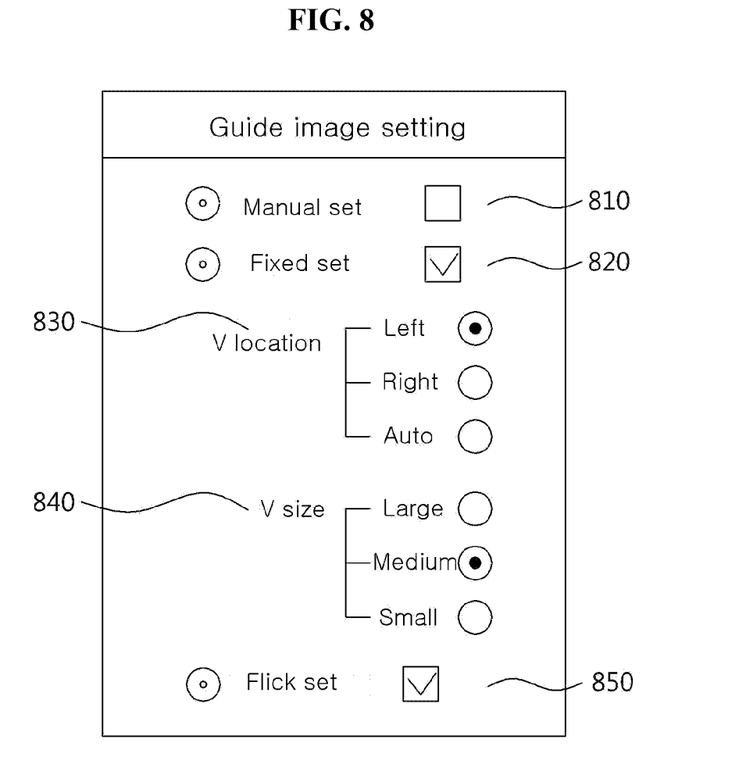
FIG. 8 is a diagram illustrating one example of options settable when a guide image is displayed on a navigation according to exemplary embodiments of the present disclosure.

FIG. 8 illustrates one embodiment of the options provided to the navigation displaying the guide image.

The generated guide image may be displayed in a manual set mode (810) which can freely change a location on a navigation map or a size of an image according to the driver's selection. In contrast, it may be displayed in a fixed set mode (820) which can fix the position and size of the guide image. In embodiments, when one of the manual setting 810 and the fixed setting 820 is activated, the other one may be non-activated automatically. For instance, even when the display of the guide image is activated, a guide image setting shown in FIG. 8 may be used.

When the fixed setting 820 shown in FIG. 8 is activated, low-ranging settings may be provided and the low-ranking settings may include a location setting 830 and a size setting 840. The location setting 830 may allow the driver to set the location of the guide image right, left or automatically. The size setting may allow the driver to set the size of the guide image from a large, middle or small size. Selection items can be more diverse and one embodiment of the navigation map is popped up and the location and size of the map is adjusted, to fix the location and size.

Explaining the location setting of the low-ranking settings again, the guide image may be fixed in a right or left portion on the guide map at the driver's convenience or the guide image may be located in right or left portion automatically. At this time, an arrangement standard of the guide image is determined in consideration of the location of the guide spot and a driving direction of a vehicle. For instance, when displaying a guide image for a guide spot needing right turn, the guide image may be located on in a right portion on the navigation shown in FIG. 7 to enhance the driver's recognition. The embodiment shown in FIG. 7 may be an embodiment having the location of the guide image fixed to the right portion on the navigation map.

Figure 9:
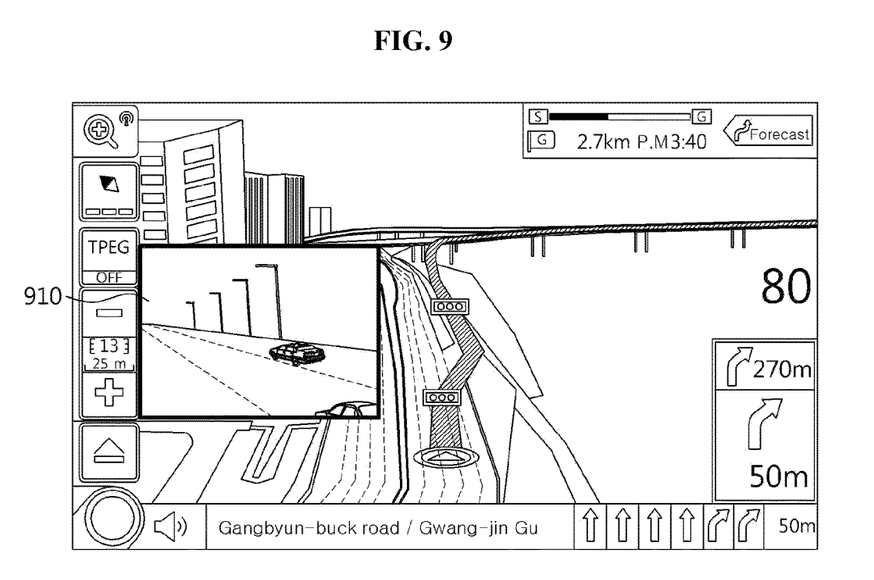
FIG. 9 is a diagram illustrating one example of the guide image displayed on a right portion of the navigation map according to exemplary embodiments of the present disclosure.

Embodiments of the guide image setting will be described specifically as follows. FIG. 9 is a diagram illustrating one embodiment in which the fixed setting 810 for the guide image is activated to fix the location 830 of the guide image in the left portion. The guide image 910 of FIG. 9 may be corresponding to a guide image which is equal to the guide image 710 of FIG. 7.

Figure 10:
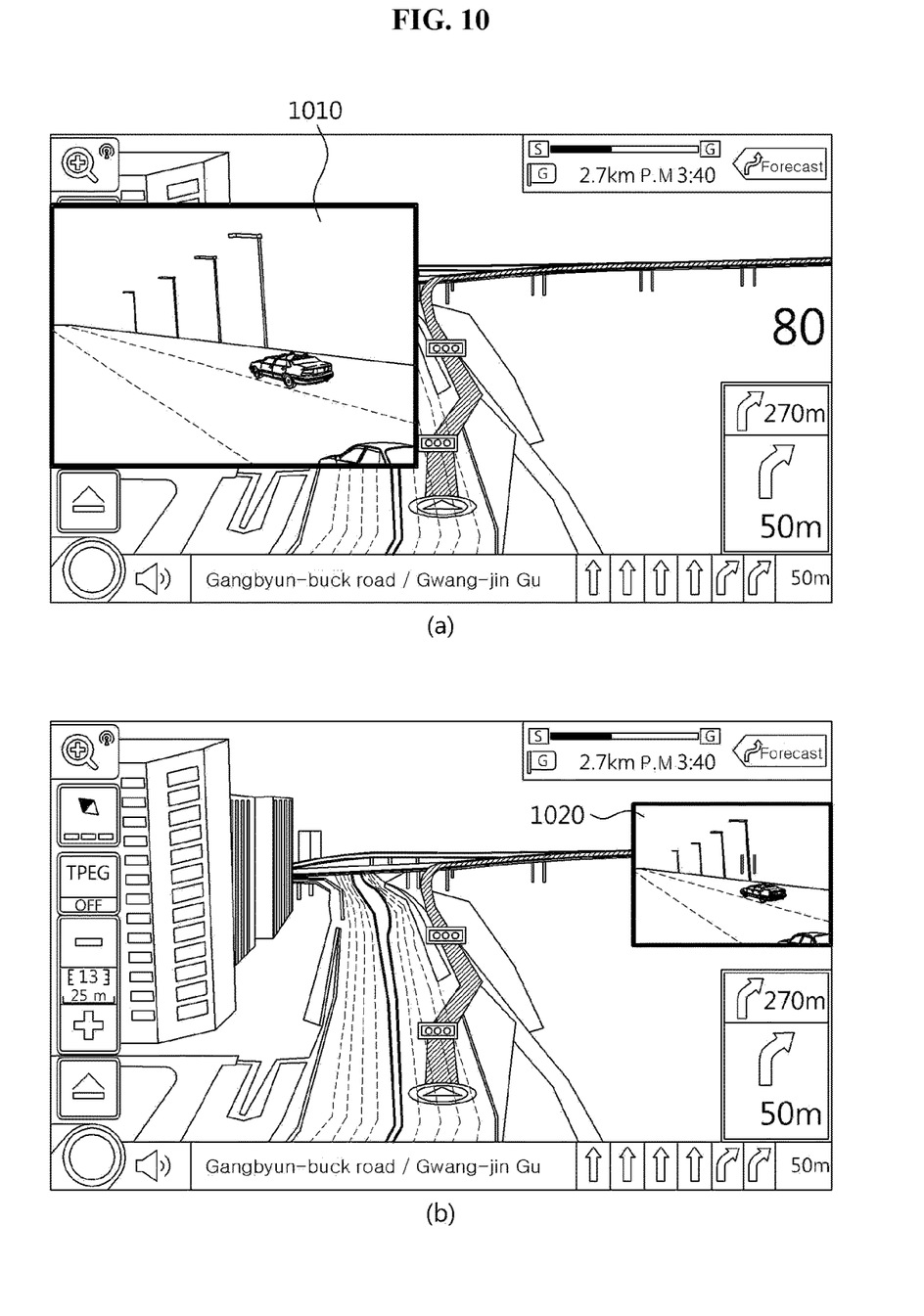
FIG. 10 is a diagram illustrating a process of controlling the size of the guide image according to exemplary embodiments of the present disclosure.

In another embodiment, FIG. 10 illustrates that the fixed setting 820 of the guide image setting is activated to set (840) the size of the guide image. When the size of the guide image 710, 910 is set as a middle size, a guide image 1010 of a picture (a) of FIG. 10 is set larger (840). The size of a guide image 1020 shown in a picture (b) is set smaller (840). The location setting shown in the pictures (a) and (b) will not be described additionally and the description thereof is equal to the description of the location setting (830) mentioned above.

The guide image 1010 and the guide image 1020 are generated by the image processing unit 220 and the image with the same resolution may be enlarged or lessened. The cut-away size of the image may be differentiated and an image screen of the guide image can be differentiated according to the size, when the image processing unit 220 generates the guide image.

The setting of the guide image size is not limited to the sizes of the guide images 1010, 1020 shown in FIG. 10 and diverse sizes of guide images may be provided. The size of the guide image has no limitation with respect to the size of the guide image.

Back to the setting of the guide image shown in FIG. 8, the guide image is activated in the manual setting 810 to adjust the location and size of the guide image freely. The screen of the navigation may be a resistive or capacitive touch screen or it may be a multi-touch input touch screen for identifying one or more touches. In one embodiment shown in FIG. 8, a guide image setting screen may be provided through a touch screen.

Figure 11:
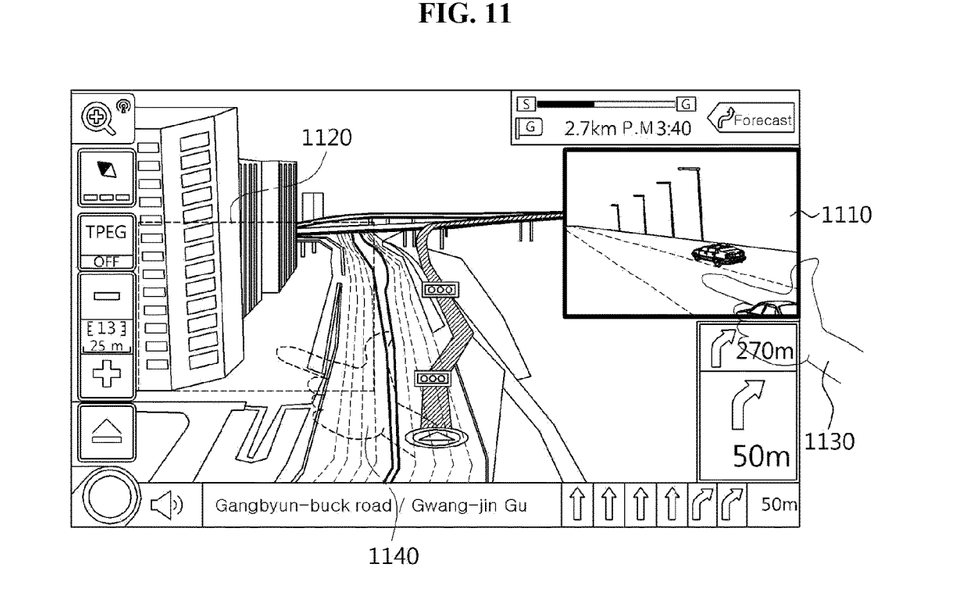
FIG. 11 is a diagram illustrating one example of the guide image moved on a touch screen according to exemplary embodiments of the present disclosure.

FIG. 11 is a diagram illustrating one example of the guide image moved on a touch screen according to exemplary embodiments of the present disclosure.

A location of a guide image 1110 may be a real-time location of the image and a location of a guide image 1120 may be a desired location to move the guide image 1110. Accordingly, the driver's finger 1130 may touch and drag the guide image 1110 to move the location of the guide image 1120. After that, the driver takes the finger 1140 off and the location of the guide image is then moved. In one embodiment, the driver's finger 1130 and 1140 may be replaced by a touch pen or other devices in accordance with types of the navigation screen.

Figure 12:
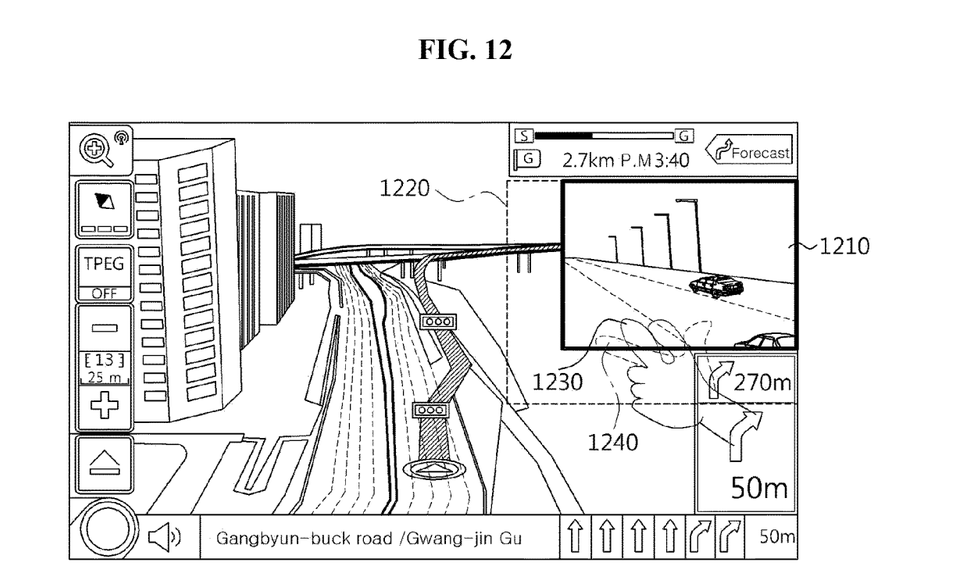
FIG. 12 is a diagram illustrating one example of a guide image of which a size is adjusted in a touch screen according to exemplary embodiments of the present disclosure.

FIG. 12 is a diagram illustrating one example of a guide image of which a size is adjusted in a touch screen according to exemplary embodiments of the present disclosure in the navigation providing the touch screen shown in FIG. 11. At this time, the guide image setting shown in FIG. 8 may be is activated as the manual setting 810 and the location setting of the guide image may be adjusted by the driver's touch and drag of the guide image as shown in FIG. 11.

In the embodiment shown in FIG. 12, the navigation may have a multi-touch screen for identifying multi-touches. As shown in FIG. 12, a guide image 1210 is a size of a real-time image which is a state before the size is adjusted into a size of a guide image 1220. In a state where the driver's two fingers 1230 are touching the screen, the driver widens a gap between the two fingers and takes the fingers 1240 off, only to a guide image 1220 having a magnified size may be displayed.

In contrast, in a state where the driver's finger 1240 is input to a touch screen, the driver narrows the gap between the fingers to be a state of the fingers 1230. In this instance, the size of the image may be a smaller size than a real-time displayed size.

In the embodiment of adjusting the size of the guide image enabled by activation of the manual setting 810, there may be embodiments for a navigation not supporting the multi-touch in which the size of the guide image is adjusted through control of a touch input time, a guide image corner.

In the embodiment of setting the guide image, the guide image may be displayed and a flicker setting 850 may be activated together. When the displayed guide image is closer a preset distance or less to a guide spot, the flicker setting 850 may be activated. The flicker setting 850 is for enhancing an effect of guiding the guide spot for the driver and it may have a guide voice. If the guide image is displayed with flickering, the driver feels irritated. Because of that, the flicker setting may be selected through a setting page. The flicker setting 850 can be set independently, regardless of setting of the manual setting 810 or the fixed setting 820.

In one embodiment of the present disclosure, an internal device of the camera compensate the external image, while collecting the external images for the guide spot through the wide angle lens camera.

Figure 13:
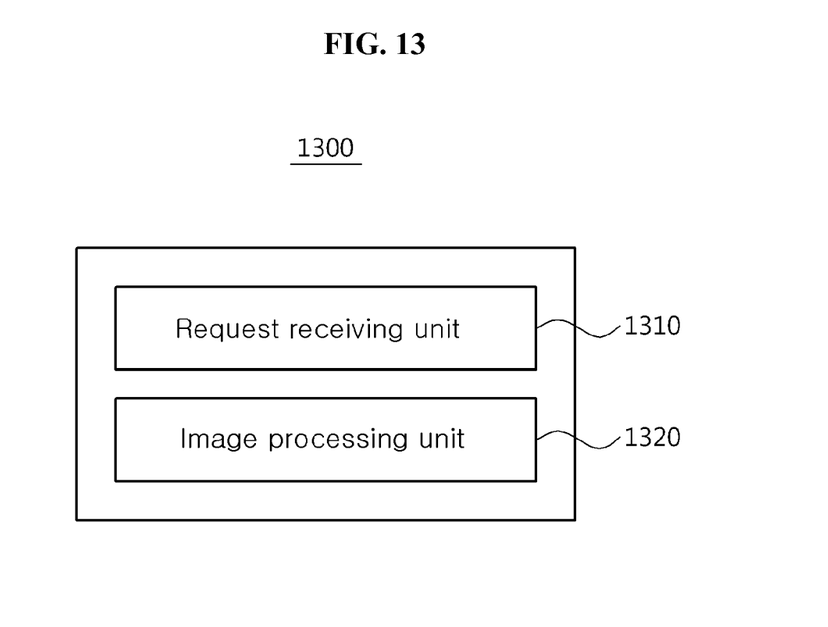
FIG. 13 is a block diagram illustrating another structure of a navigation guide apparatus according to exemplary embodiments of the present disclosure.

FIG. 13 is a block diagram illustrating another structure of a navigation guide apparatus according to exemplary embodiments of the present disclosure. The navigation guide apparatus 1300 according to this embodiment may be operated in a black box for vehicle including the wide angle lens camera. The navigation may include request receiving unit 1310 and an image processing unit 1320.

The request receiving unit 1310 may receive a request of an external image which is a driving direction image of a driving vehicle from the navigation. In guiding the guide spot of the navigation, it is quite important to guide turn points such as right turn, left turn or U-turn. When arriving at the guide spot on the guide route, the navigation may transfer an external image or the guide spot to the wide angle lens camera and the request receiving unit 1310 may receive a signal associated with the request via a wire or wirelessly.

The wide angle lens camera may not transfer the constantly collecting external images to the navigation directly but compensate the external image into an easy-guidable guide image before transferring the compensated image to the navigation.

Accordingly, the image processing unit 1320 may acquire one of the collecting external images which are requested to receive and transmit the requested image to the navigation. For instance, the external image having information on peripheral vehicles and driving geographic information is compensated to acquire the guide image and transmit the acquired guide image to the navigation. The embodiment may be similar to the embodiment of the image processing unit 220 described, referring to FIG. 2. The image collected by the wide angle lens camera is different from the actual image viewed through human eyes. The reason why the image is compensated is to reduce the sense of such difference.

The image processing unit 1320 may provide an algorithm for compensating the external image with respect to distortion which might occur because the image collected through the wide angle lens camera is collected with a broad view angle. In one embodiment:

1) Parameters provided in the camera, for instance, values of contrast, sharpness, chroma and tone and a distortion factor of a camera lens may be calculated via calibration of the wide angle lens camera for external images, for instance.

2) Undistortion Map Table which is a computer vision technology may be generated, using the calculated parameters and lens distortion factor.

3) Distortion of the high resolution real-time external image collected by the wide angle lens camera is reduced, using the undistortion map table, and the undistorted image can be extracted in real time.

Once the processes of 1)~3) are performed, an undistorted external image may be acquired and such the external image may be a screen having little difference from the image directly viewed by a person.

Figure 14:
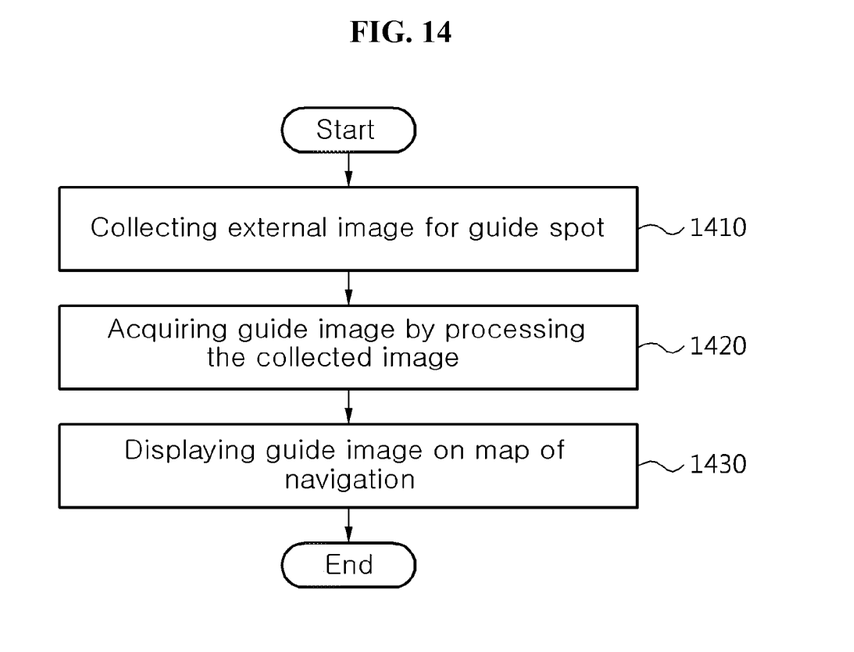
FIG. 14 is a flow chart illustrating each of steps provided in a navigation guide method according to exemplary embodiments of the present disclosure.

FIG. 14 is a flow chart illustrating each of steps provided in a navigation guide method according to exemplary embodiments of the present disclosure. The navigation guide method may be performed by the navigation guide apparatus 200 shown in FIG. 2 and each of steps provided in the method may be simplified or specified by the navigation guide apparatus 200.

In a step 1410, the navigation guide apparatus 200 may collect the external image which is the driving direction image of the vehicle captured by the wide angle lens camera. For instance, the wide angle lens camera may be a black box for a vehicle which supports a HD-grade or more high solution image, with a board view angle. The navigation guide apparatus 200 and the wide angle lens camera are connected with each other via a wire wirelessly, to make a request for an external image in a state where the external image can be received easily.

A step 1410 may be performed when the location of the vehicle is closer a preset distance or less to the guide spot to desire to guide the vehicle. The acquired external is to guide a turn point such as right turn, left turn and U-turn and it may include real-time information on peripheral vehicles and driving roads.

In a step 1420, the navigation guide apparatus 200 may process the collected external images and acquire the guide image. For the guide image, an image corresponding to a direction of the guide spot is extracted from the external image to allow the user to identify the guide spot easily. The guide image has severe distortion to be displayed on the navigation as it is and there could be a difference between the image identified by the driver's eyes and the guide image. Accordingly, the distortion may be reduced to be proper as the guide image.

At this time, an algorithm for compensating the external image may be provided and description of the algorithm is mentioned in the description of the navigation guide apparatus 200. The external image may be cut away to display a partial image corresponding to the guide spot for the driver to identify the undistorted guide image.

In the guide image processed as mentioned above, the navigation guide apparatus 200 may be displayed on a map of the navigation in a step 1430. When displaying the guide image, the guide image may be arranged in consideration of the location of the guide spot and the driving direction on the navigation map.

In the step 1430, the navigation guide apparatus 200 may provide diverse settings to display the guide image on the navigation. The settings may be described in the embodiment shown in FIG. 8.

In the embodiments, the displaying of the guide image may be performed on the route guide constantly or by identifying whether the driving vehicle is closer a preset distance or less to the guide spot.

According to the embodiments of the present disclosure, to guide a turn point which occupies a crucial part on the navigation route, an actual image of the actual turning point as well as the route on the navigation map may be displayed. Accordingly, the guide apparatus and method having an enhanced guide effect may be provided to the driver. The somewhat distorted images collected via the wide angle lens camera are compensated. Accordingly, the image with no sense of difference between the image actually viewed by the driver and the collected guide image may be provided.

The navigation according to the exemplary embodiments of the present disclosure may be realized as CNS (Car Navigation System) or PNP (Personal Navigation System) or it may be realized as an application for a mobile terminal such as a smart phone or a tablet.

The navigation guide methods according to the embodiments of the present disclosure may be realized as program instructions performable via diverse computer devices and they may be recorded in a computer readable media. Especially, the embodiments may include a computer readable media recording a program which includes a step of collecting the external image which is the driving direction image of the vehicle captured via the wide angle lens camera; a step of acquiring the guide image associated with the guide spot by processing the collected image; and a step of displaying the acquired guide image on the navigation.

The navigation guide method according to the embodiments of the present disclosure may be realized as program instruction implemented by various computer means and recorded in a computer readable medium. The computer readable medium may include a program command, a data file, a data structure or combination of them. The program command recorded in the medium may be configured for exemplary embodiments of the disclosure. Examples of computer readable medium include magnetic medium such as a hard disk, a floppy disk, optical medium such as CD-ROM and DVD, magneto-optical medium such as a floptical disk, and a hardware device such as ROM, RAM, and a flash memory. The hardware device may be configured to execute one or more software modules to implement the exemplary embodiments. The software may include a computer program, a code, an algorithm, an instruction, and any combination thereof. The software may include a mechanical language code made by a compiler and a high level language code implementable by a computer, using an interpreter, and the like. The software may be dispersed on a computer system or through a network. The software and data may be stored or implemented in one or more computer readable recording medium.

It will be apparent to those skilled in the art that various modifications and variations can be made in the present disclosure without departing from the spirit or scope of the disclosed subject matter.

Thus, it is intended that the present disclosure cover the modifications and variations of the disclosed subject matter provided they come within the scope of the appended claims and their equivalents.

What is claimed is:

1. A navigation guide apparatus comprising:
   a processor including:
      an image acquiring unit for collecting a real-time external image which is a driving direction image of a vehicle captured by a wide angle lens camera mounted on the vehicle; and
      an image processing unit for acquiring a guide image associated with a guiding point in a driving route by processing the collected real-time external image;
   and
   an image display for:
      displaying a map that includes the driving route; and
      displaying the acquired guide image together with the map responsive to the navigation guide apparatus providing navigation information related to the guiding point of the driving route, wherein the acquired guide image does not include the driving route, wherein the displayed guide image is overlapped on at least a portion of the map, wherein the image processing unit extracts the guide image from the collected real-time external image, wherein the guide image is an actual image corresponding to a driving direction of the vehicle to the guiding point wherein the image display determines whether the guide image will be arranged on a left side or a right side of the map based on a location of the guiding point and a direction of a turn that is indicated by the guiding point provided by the navigation information, and wherein the guide image is displayed on the determined side of the map that matches the direction of the turn with respect to a center of the map.

2. The navigation guide apparatus of claim 1, wherein the image acquiring unit collects the real-time external image, when a location of the vehicle is a preset distance or less to the guiding point.

3. The navigation guide apparatus of claim 1, wherein the wide angle lens camera is a high resolution camera, with keeping a broad view angle, and the image acquiring unit collects the real-time external image, with being connected with the high resolution camera via a wire or wirelessly.

4. The navigation guide apparatus of claim 1, wherein the guide image associated with the guiding point acquired by the image processing unit is a real-time image for the guiding point.

5. The navigation guide apparatus of claim 4, wherein the guiding point corresponds to a right turn, a left turn, or a U-turn, and the real-time image comprises vehicles in a periphery of the real-time image and driving geographic information.

6. The navigation guide apparatus of claim 4, wherein the real-time external image comprises a panorama image and an origin coordinate of the panorama image is equal to a coordinate of a compass or a relative angle is defined in advance.

7. The navigation guide apparatus of claim 6, wherein the image processing unit acquires the guide image for the guiding point from the panorama image, considering that an angle of the camera is rotated as an angle between a driving direction of the vehicle and a direction of the guiding point is varied according to a time or distance.

8. The navigation guide apparatus of claim 1, wherein the image processing unit acquires the guide image by compensating a distortion of the real-time external image through sequentially performing 1)~3):
1) calculating internal parameters and lens distortion factor of the wide angle lens camera;
2) generating an undistortion map table, using the parameters and lens distortion factor; and
3) extracting the undistorted image in real time, using the undistortion map table.

9. The navigation guide apparatus of claim 1, wherein the image display displays the guide image as flickering, when the displaying guide image is closer to a preset distance or less to the guide spot.

10. The navigation guide apparatus of claim 1, wherein the image display magnifies or lessens the guide image.

11. The navigation guide apparatus of claim 1, wherein the image display performs at least one of moving, magnifying and lessening of the guide image on a map of the navigation guide apparatus via a touch screen, when the navigation provides a touchscreen.

12. A navigation guide apparatus operating with a camera mounted on a vehicle comprising a wide angle lens camera, the navigation guide apparatus comprising:
a processor including;
a request receiving unit for receiving a request for a guide image associated with a guiding point in a driving route, the guide image from real-time external images which are driving-direction images from the navigation guide apparatus, the driving-direction images being captured by the wide angle lens camera; and
an image processing unit for acquiring the guide image and transmitting the guide image to the navigation guide apparatus,
and
an image display for:
displaying a map that includes the driving route; and
displaying the acquired guide image together with the map responsive to the navigation guide apparatus providing navigation information related to the guiding point of the driving route, wherein the acquired guide image does not include the driving route, wherein the displayed guide image is overlapped on at least a portion of the map;
wherein the image processing unit extracts the guide image from the real-time external image,
wherein the guide image is an actual image corresponding to a driving direction of the vehicle to the guiding point,
wherein the image display determines whether the guide image will be arranged on a left side or a right side of the map based on a location of the guiding point and a direction of a turn that is indicated by the guiding point provided by the navigation information, and
wherein the guide image is displayed on the determined side of the map that matches the direction of the turn with respect to a center of the map.

13. The navigation guide apparatus of claim 12, wherein the request for the guide image received by the request receiving unit is received when a location of the vehicle is a preset distance or less from the guiding point, and
the guide image is a real-time image corresponding to a driving direction of the vehicle to the guiding point and the guiding point corresponds to a right turn, a left turn, or a U-turn.

14. The navigation guide apparatus of claim 12, wherein the image processing unit acquires the guide image by compensating a distortion of the real-time external image through sequentially performing 1)~3):
1) calculating internal parameters and lens distortion factor of the wide angle lens camera;
2) generating an undistortion map table, using the parameters and lens distortion factor; and
3) extracting the undistorted image in real time, using the undistortion map table.

15. A navigation guide method comprising:
collecting a real-time external image which is a driving direction image of a vehicle captured by a wide angle lens camera mounted on the vehicle;
acquiring a guide image associated with a guiding point in a driving route by processing the collected real-time external image;
displaying a map that includes the driving route;
determining whether the guide image will be arranged on a left side or a right side of the map based on a location of the guiding point and a direction of a turn that is indicated by the guiding point provided by the navigation information;

displaying the acquired guide image together with the map responsive to providing navigation information related to the guiding point of the driving route, wherein the acquired guide image does not include the driving route, wherein the displayed guide image is overlapped on at least a portion of the map, and the guide image is displayed on the determined side of the map that matches the direction of the turn with respect to a center of the map;

wherein acquiring the guide image extracts the guide image from the collected real-time external image, wherein the guide image is an actual image corresponding to a driving direction of the vehicle to the guiding point.

16. The navigation guide method of claim 15, wherein collecting the real-time external image comprises collecting the real-time external image, when a location of the vehicle is closer to a preset distance or less to the guiding point.

17. The navigation guide method of claim 15, wherein the wide angle lens camera is a high resolution camera, with keeping a broad view angle, and the real-time external image is collected via the wire or wireless connection with the high resolution camera.

18. The navigation guide method of claim 15, wherein the guide image associated with the guiding point is a real-time image for the guiding point and the guiding point corresponds to a right turn, a left turn, or a U-turn.

19. The navigation guide method of claim 15, wherein acquiring the guide image comprises acquiring the guide image by compensating a distortion of the real-time external image through sequentially performing 1)~3):
1) calculating internal parameters and lens distortion factor of the wide angle lens camera;
2) generating an undistortion map table, using the parameters and lens distortion factor; and
3) extracting the undistorted image in real time, using the undistortion map table.

20. The navigation guide method of claim 15, wherein displaying the acquired guide image comprises determining a location where the guide image will be arranged on the map based on a location of the guiding point and a turning direction guided by the navigation information related to the guiding point, and the guide map is displayed on a same side of the map with the turning direction with respect to a center of the map.

21. A non-transitory computer readable storage medium storing commands for a navigation guide method, the commands when executed by a computer processor cause the processor to perform steps comprising:

collecting a real-time external image which is a driving direction image of a vehicle captured by a wide angle lens camera mounted on the vehicle;

acquiring a guide image associated with a guiding point in a driving route by processing the collected real-time external image;

displaying a map that includes the driving route;

determining whether the guide image will be arranged on a left side or a right side of the map based on a location of the guiding point and a direction of a turn that is indicated by the guiding point provided by the navigation information displaying the acquired guide image together with the map responsive to providing navigation information related to the guiding point of the driving route, wherein the acquired guide image does not include the driving route, wherein the displayed guide image is overlapped on at least a portion of the map, and the guide image is displayed on the determined side of the map that matches the direction of the turn with respect to a center of the map;

wherein acquiring the guide image extracts the guide image from the collected real-time external image, wherein the guide image is an actual image corresponding to a driving direction of the vehicle to the guiding point.

* * * * *